US012782613B2

(12) United States Patent
Yang et al.

(10) Patent No.: US 12,782,613 B2
(45) Date of Patent: Nov. 3, 2026

(54) POLARIZER, METHOD OF PREPARING POLARIZER, AND DISPLAY PANEL

(71) Applicant: TCL CHINA STAR OPTOELECTRONICS TECHNOLOGY CO., LTD., Shenzhen (CN)

(72) Inventors: Weiheng Yang, Shenzhen (CN); Zhichao Liao, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 331 days.

(21) Appl. No.: 18/569,212

(22) PCT Filed: Sep. 11, 2023

(86) PCT No.: PCT/CN2023/118006
§ 371 (c)(1),
(2) Date: Dec. 11, 2023

(87) PCT Pub. No.: WO2025/050416
PCT Pub. Date: Mar. 13, 2025

(65) Prior Publication Data

US 2025/0231327 A1 Jul. 17, 2025

(30) Foreign Application Priority Data

Sep. 6, 2023 (CN) ......................... 202311144994.X

(51) Int. Cl.
*G02B 5/02* (2006.01)
*G02B 1/14* (2015.01)
(Continued)

(52) U.S. Cl.
CPC ............ *G02B 5/0242* (2013.01); *G02B 1/14* (2015.01); *G02B 5/0268* (2013.01); *G02B 5/3041* (2013.01); *G02F 1/133528* (2013.01)

(58) Field of Classification Search
CPC ................................................ G02F 1/133504
See application file for complete search history.

(56) References Cited

U.S. PATENT DOCUMENTS

2005/0255291 A1* 11/2005 Iwata .................. G02B 5/0278
428/156
2007/0148482 A1* 6/2007 Fujinaka ................. G02C 7/12
428/910

FOREIGN PATENT DOCUMENTS

CN 101341427 A 1/2009
CN 102193132 A 9/2011
(Continued)

OTHER PUBLICATIONS

Korean Office Action issued in corresponding Korean Patent Application No. 10-2023-7036899 dated Nov. 7, 2024, pp. 1-16.
(Continued)

*Primary Examiner* — Joseph L Williams
(74) *Attorney, Agent, or Firm* — PV IP PC; Christopher S. Ruprecht; Wei Te Chung

(57) ABSTRACT

The present disclosure is directed to a polarizer and a preparation method thereof, and a display panel, to alleviate the technical problem of rainbow pattern phenomenon in existing display devices. In response to the problem of rainbow stripes in existing display devices, poly ethylene terephthalate (PET) in polarizers exhibits anisotropy after being extended into a film due to its crystalline properties, resulting in birefringence when light passes through PET.

11 Claims, 4 Drawing Sheets

(51) Int. Cl.
*G02B 5/30* (2006.01)
*G02F 1/1335* (2006.01)

(56) References Cited

FOREIGN PATENT DOCUMENTS

| | | | |
|---|---|---|---|
| CN | 109782379 | A | 5/2019 |
| CN | 114806351 | A | 7/2022 |
| CN | 116699737 | A | 9/2023 |
| JP | 2004094191 | A | 3/2004 |
| JP | 2006011419 | A | 1/2006 |
| JP | 2008046496 | A | 2/2008 |
| JP | 2008134542 | A | 6/2008 |
| JP | 2011209701 | A | 10/2011 |
| JP | 2011227475 | A | 11/2011 |
| JP | 2016161833 | A | 9/2016 |
| JP | 2019090905 | A | 6/2019 |
| JP | 2019144283 | A | 8/2019 |
| JP | 2021193451 | A | 12/2021 |
| KR | 20040004606 | A | 1/2004 |

OTHER PUBLICATIONS

Eurasian Office Action issued in corresponding Eurasian Patent Application No. 202490573 dated Nov. 19, 2024, pp. 1-2.

Chinese Office Action issued in corresponding Chinese Patent Application No. 202311144994.X dated Nov. 4, 2023, pp. 1-9.

International Search Report in International application No. PCT/CN2023/118006, mailed on Nov. 24, 2023.

Written Opinion of the International Search Authority in International application No. PCT/CN2023/118006, mailed on Nov. 24, 2023.

Japanese Office Action issued in corresponding Japanese Patent Application No. 特願 2023-571965 dated Jan. 6, 2026, pp. 1-5.

* cited by examiner

POLARIZER, METHOD OF PREPARING POLARIZER, AND DISPLAY PANEL

CROSS REFERENCE TO RELATED APPLICATIONS

This application is a US national phase application based upon an International Application No. PCT/CN2023/118006, filed on Sep. 11, 2023, which claims the priority of Chinese Patent Application No. 202311144994.X, entitled "Polarizer, Method of Preparing Polarizer, and Display Panel", filed on Sep. 6, 2023, the disclosure of which is incorporated herein by reference in its entirety.

FIELD OF THE INVENTION

The present disclosure relates to the field of display technology, more particularly, to a polarizer and a preparation method thereof, and a display panel.

BACKGROUND

With the rapid development of liquid crystal display technology, liquid crystal displays have become the mainstream products, such as small-scale mobile phone screens and large-sized computer and television screens, in the display field. Therefore, the market has high requirements for the image quality and environmental adaptability of displays.

The structure of a liquid crystal display consists of two glass substrates sandwiched with a layer of liquid crystal. Specifically, the liquid crystal display includes a backlight module, a light guide plate, a lower polarizer, a lower glass substrate, a thin film transistor array, a liquid crystal layer, a color filter, a upper glass substrate, and a upper polarizer from bottom to top. The light emitted from by the backlight module is diffused through the light guide plate and then passes through the polarizer in the 90 degrees direction of the lower absorption axis (perpendicular to the paper surface outward). The 90 degrees component of the natural light is absorbed, resulting in linearly polarized light with a polarization direction parallel to the 0 degrees direction (horizontally parallel to the paper surface). When there is no electric field change, the liquid crystal molecules do not deflect, and the polarization direction of the emitted linearly polarized light does not change and is absorbed by the polarizing plate in the 0 degrees direction of the upper absorption axis, resulting in no light transmission and a dark state. When the current passes through the transistor and generates an electric field change, the liquid crystal molecules undergo deflection, and the polarization direction of the horizontally polarized light becomes vertically polarized light, which passes through the upper polarizer without being absorbed, presenting a bright state. In addition, the upper layer of glass is bonded to a color filter, and based on colorimetric principles, each pixel is composed of three sub-pixels of RGB. These sub-pixels emitting red, blue, and green colors are mixed and transmitted to the human eye, forming a colorful display screen.

In the working principle of display devices, polarizers play a crucial role in optical switching, consisting of a substrate protection layer, polarizing layer, liquid crystal compensation layer, pressure sensitive adhesive (PSA), and release film. In the long-term application process, a polarizer with a protective layer of polyethylene terephthalate (PET) substrate is used as the substrate. Due to the crystallization characteristics of PET material, a birefringence effect is formed, which can easily lead to a rainbow pattern phenomenon in the display.

SUMMARY

Technical Problem

One embodiment of the present disclosure is directed to a polarizer and a preparation method thereof, and a display panel, to alleviate the technical problem of rainbow pattern phenomenon in existing display devices.

Technical Solution

One embodiment of the present disclosure is directed to a polarizer.

The polarizer includes a polarizing film and a protective layer.

The protective layer is arranged on one side of the polarizing film.

One side of the protective layer away from the polarizing film is provided with a concave-convex structure.

The concave-convex structure comprises a plurality of concave-convex sub-surfaces of different shapes or sizes.

In one embodiment of the present disclosure, the polarizer further includes a dimming film arranged on the side of the protective layer away from the polarizing film, and one side of the dimming film has the concave-convex structure.

In one embodiment of the present disclosure, the dimming film comprises a substrate layer and a plurality of first diffusion particles dispersed within the substrate layer. The dimming film comprises the concave-convex structure formed by some of first diffusion particles protruding from a surface of the dimming film on one side away from the protective layer.

In one embodiment of the present disclosure, the dimming film comprises a substrate layer and a plurality of first diffusion particles dispersed within the substrate layer. The dimming film comprises the concave-convex structure formed by some of first diffusion particles protruding from a surface of the dimming film on one side near the protective layer.

In one embodiment of the present disclosure, the dimming film further comprises a plurality of second diffusion particles dispersed within the substrate layer. The second diffusion particles and the first diffusion particles protrude from the same side of the surface of the dimming film, and some of the first diffusion particles are located on the side on which the second diffusion particles are away from the concave-convex structure.

In one embodiment of the present disclosure, a size of each of the first diffusion particles is greater than a size of each of the second diffusion particles.

In one embodiment of the present disclosure, the substrate layer comprises an ultraviolet (UV) cured resin substrate, each of the first diffusion particles comprises polymethyl methacrylate particles, and each of the second diffusion particles comprises one of silicon dioxide particles, titanium dioxide particles, and zinc dioxide particles.

In one embodiment of the present disclosure, a haze range of the polarizer is 20% to 70%.

In one embodiment of the present disclosure, an angle between a normal of each of the concave-convex surfaces and a plane parallel to the protective layer ranges between 0 to 180 degrees.

Another embodiment of the present disclosure is directed to a method for preparing a polarizer. The method includes:

attaching a protective layer on one side of a polarizing film;

preparing a concave-convex structure, which comprises a plurality of concave-convex sub-surfaces of different shapes or sizes, on one side of the protective layer away from the polarizing film.

In one embodiment of the present disclosure, the step of preparing a concave-convex structure on one side of the protective layer away from the polarizing film further comprises:

mixing a UV curable resin, a UV curable monomer, and a plurality of first diffusion particles in a solvent to form a dimming solution;

coating the dimming solution on the side of the protective layer away from the polarizing film;

curing the dimming solution to form a dimming film, and one side of the dimming film forms the concave-convex structure.

In one embodiment of the present disclosure, the dimming solution further comprises a plurality of second diffusion particles. A particle size of each of the second diffusion particles is smaller than that of each of the first diffusion particles, each of the second diffusion particles comprises a plurality of inorganic silica particles with a plurality of particle sizes ranging from 30 nanometers to 70 nanometers, and each of the first diffusion particles comprises a plurality of polymethyl methacrylate particles with a plurality of particle sizes ranging from 2 microns to 3 microns.

In one embodiment of the present disclosure, a mass fraction of the first diffusion particles and the second diffusion particles in the dimming solution ranges from 2.5% to 20%, and a ratio of the first diffusion particles and the second diffusion particles is 7:3.

Still another embodiment of the present disclosure is directed to a display panel comprising a polarizer as provided in the above embodiments. The polarizer is prepared by the method as provided in the above embodiments.

Advantageous Effect

The present disclosure provides a polarizer and its preparation method, as well as a display panel. The polarizing film comprises a polarizing film, a protective layer, and a dimming film. The protective layer is set on one side of the polarizing film, and the dimming film is set on the side of the protective layer away from the polarizing film. The dimming film has a concave-convex structure, which comprises a plurality of concave-convex surfaces of different shapes and/or sizes. The present disclosure involves setting a dimming film with a concave-convex structure on the side of the protective layer away from the polarizing film, so that when the light directed towards the polarizing film passes through the concave-convex structure of the dimming film, based on the principle of diffuse reflection, the light will be evenly scattered. When the evenly scattered light passes through the protective layer again, the intensity and energy of each wavelength will be evenly dispersed, thereby avoiding the occurrence of rainbow pattern phenomenon in existing display devices.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF THE EMBODIMENTS

Figure 1:
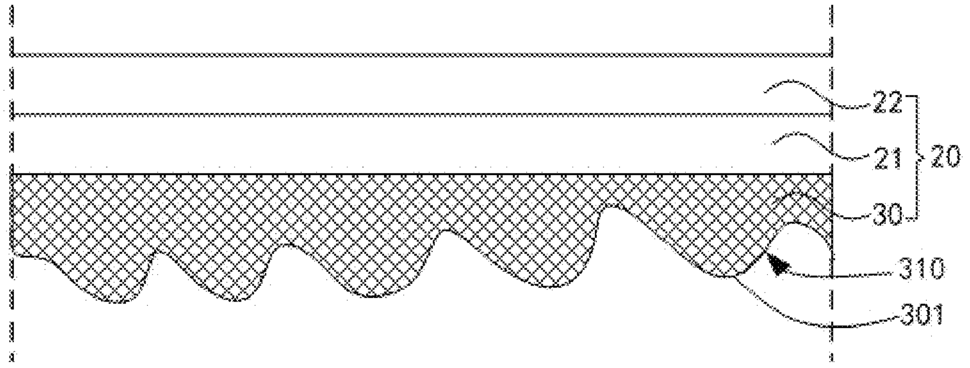
FIG. 1 is a schematic diagram of a cross-sectional structure of a polarizer according to one embodiment of the present disclosure.

The description of each embodiment below is a reference to the additional illustration to illustrate a particular embodiment that may be embodied by the present application. The directional terms mentioned in the present application, such as "up", "down", "front", "back", "left", "right", "inside", "outside", "side", etc., are only directions with reference to the additional schema. Therefore, directional terms used are intended to illustrate and understand the present application, not to limit the present application. In the figure, structurally similar elements are represented by the same designator. In the drawings, the thickness of some layers and areas is exaggerated for clarity and ease of description. That is, the size and thickness of each component shown in the drawings are arbitrarily shown, but the present application is not limited thereto.

In response to the problem of rainbow stripes in existing display devices, poly ethylene terephthalate (PET) in polarizers exhibits anisotropy after being extended into a film due to its crystalline properties, resulting in birefringence when light passes through PET. When white light passes through PET materials, the materials have selective light transmittance properties, and the light transmittance varies at different wavelengths. Among them, the light transmittance in the 500 nm band is low, while the transmittance in the 450 nm and 600 nm bands is high, leading to the occurrence of a rainbow pattern phenomenon.

Therefore, one embodiment of the present disclosure is directed to a polarizer and a preparation method thereof, and a display panel, to solve the above problems.

Figure 2:
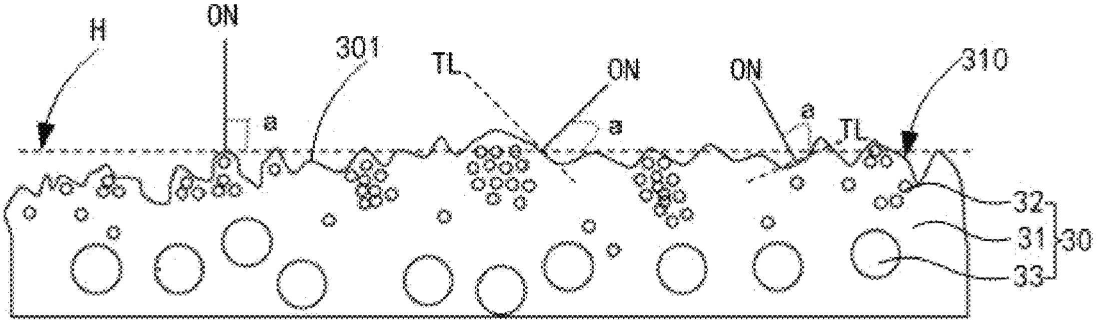
FIG. 2 is a detailed structural diagram of a dimming film according to one embodiment of the present disclosure.
Figure 3:
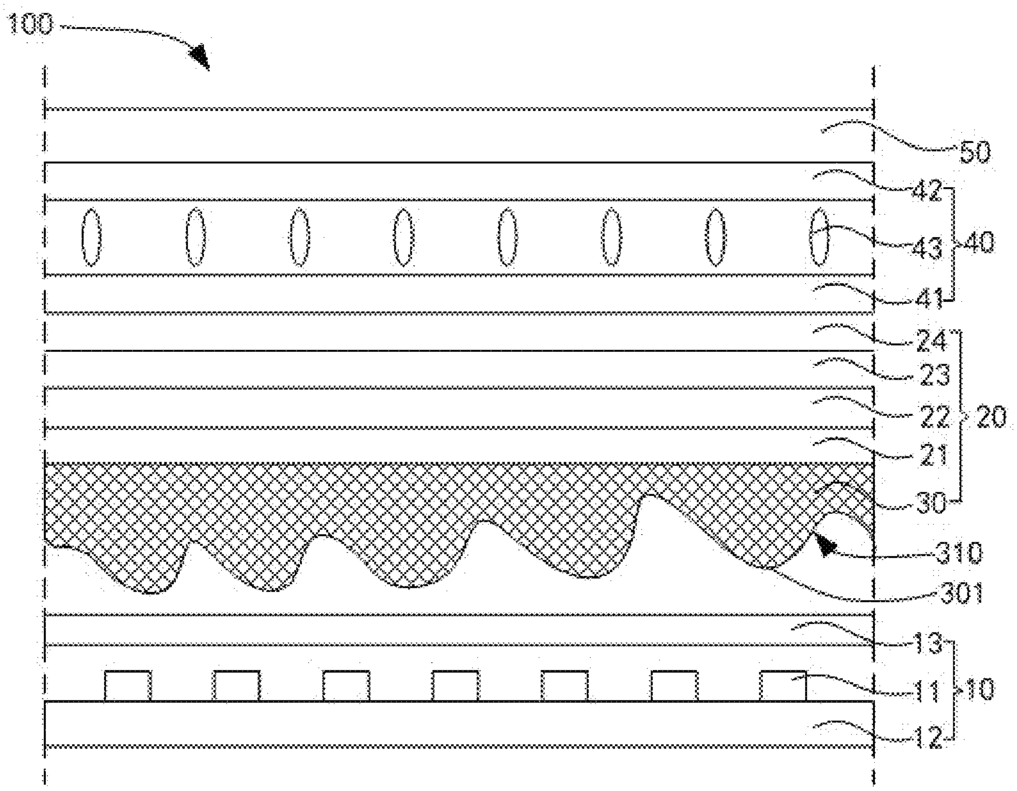
FIG. 3 is a schematic diagram of a cross-sectional structure of a display panel according to one embodiment of the present disclosure.

Please refer to FIGS. 1 to 3. FIG. 1 is a schematic diagram of a cross-sectional structure of a polarizer according to one embodiment of the present disclosure. FIG. 2 is a detailed structural diagram of a dimming film according to one embodiment of the present disclosure. FIG. 3 is a schematic diagram of a cross-sectional structure of a display panel according to one embodiment of the present disclosure. Please refer to FIG. 1, the polarizer 20 comprises a protective layer 21 and a polarizing film 22. The protective layer 21 is arranged on one side of the polarizing film 22. The side of the protective layer 21 away from the polarizing film 22 is provided with a concave-convex structure 301, which comprises a plurality of concave-convex sub-surfaces 310 of different shapes and/or sizes.

In this embodiment, by setting a concave and convex structure 301 on the side of the protective layer 21 away from the polarizing film 22, the light directed towards the polarizing film 20 is evenly dispersed based on the diffuse reflection principle when passing through the concave and convex structure 301. When the evenly dispersed light passes through the protective layer 21 of the polarizing film 20 again, the light intensity energy of each wavelength is evenly dispersed, thereby avoiding the occurrence of the rainbow pattern phenomenon and solving the technical problem of rainbow pattern phenomenon in existing display devices.

Optionally, the polarizing film 20 also comprises a dimming film 30 located on the side of the protective layer 21 away from the polarizing film 22, and one side of the dimming film 30 has the concave-convex structure 301. That is to say, the concave-convex structure 301 located on the side of the protective layer 21 away from the polarizing film 22 is formed by the dimming film 30. The dimming film 30 can be directly prepared on the protective layer 21 of the polarizer 20, or directly adhered to the protective layer 21 of the polarizer 20.

The dimming film 30 has a concave-convex structure 301, which is located on the side of the dimming film 30 away from the protective layer 21. The concave-convex structure 301 comprises irregular a plurality of concave-convex sub-surfaces 310, and the shape and/or size of the plurality of concave-convex sub-surfaces 310 are different. Among them, the irregularity in a plurality of irregular concave-convex sub-surfaces 310 refers to the lack of fixed patterns in the shape and arrangement of each concave-convex sub-surface 310, such as the different shapes and/or sizes of each concave-convex sub-surface 310. Size can refer to the height of the concave-convex surface from the protective layer 21 and the area of the concave-convex surface 310.

The structure of the dimming film 30 will be described in detail below:

Please refer to FIGS. 1 and 2, the dimming film 30 comprises a substrate layer 31 and a plurality of first diffusion particles 32 dispersed within the substrate layer 31. At least some of the first diffusion particles 32 protrude from the surface of the dimming film 30 on the side away from the protective layer 21, forming the concave-convex structure 301.

Furthermore, the dimming film 30 further comprises a second diffusion particle 33 dispersed within the substrate layer 31. The second diffusion particle 33 protrudes from the same surface of the dimming film 30 as the first diffusion particle 32, and some of the first diffusion particles 32 are located on the side of the second diffusion particle 33 away from the concave-convex structure 301. The ratio of the first diffusing particle 32 to the second diffusing particle 33 is 7:3.

The particle size of the second diffusion particle 33 is smaller than that of the first diffusion particle 32, for example, the particle size range of the first diffusion particle 32 is 2 microns to 3 microns. The particle size range of the second diffusion particle 33 is from 30 nanometers to 70 nanometers, e.g., 30 nanometers, 40 nanometers, 50 nanometers, 60 nanometers, 70 nanometers. Optionally, the first diffusion particle 32 comprises particles such as polymethyl methacrylate (PMMA), and the second diffusion particle 33 comprises at least one of particles such as silica particles, titanium dioxide particles, and zinc dioxide particles. The substrate layer 31 comprises a UV cured resin substrate, such as epoxy acrylate oligomers or polyurethane acrylic oligomers with molecular weights ranging from hundreds to tens of thousands.

The first diffusion particle 32 and the substrate layer 31 belong to different substances and do not dissolve with each other in the same system, making the first diffusion particle 32 randomly distributed within the substrate layer 31. Some of the first diffusion particles 32 are distributed on the side of the substrate layer 31 away from the protective layer 21, and will protrude from the surface of the dimming film 30 away from the protective layer 21, forming the concave-convex structure 301. And some of the first diffusion particles 32 are distributed on the side of the substrate layer 31 near the protective layer 21, and will be completely wrapped by the substrate layer 31. Due to the random and unfixed distribution of the first diffusing particle 32 at different positions, the concave-convex structure 301 formed by the dimming film 30 is also irregular.

Similarly, the second diffusion particle 33 and the substrate layer 31 belong to different substances and do not dissolve with each other in the same system, making the second diffusion particle 33 randomly distributed within the substrate layer 31. Some of the second diffusion particles 33 are distributed on the side of the substrate layer 31 away from the protective layer 21, just like the first diffusion particle 32, The surface of the dimming film 30 protrudes from the side away from the protective layer 21, forming the concave-convex structure 301. Moreover, the distribution position and quantity of the second diffusion particle 33 at different positions are also random and not fixed, making the concave-convex structure 301 formed by the dimming film 30 irregular.

The density of the first diffusing particle 32 is greater than that of the second diffusing particle 33, making it easier for the first diffusing particle 32 to deposit compared to the second diffusing particle 33, that is, the number of particles away from the concave-convex structure 301 in the first diffusing particle 32 is greater than the number of particles away from the concave-convex structure 301 in the second diffusing particle 33, Make some of the first diffusion particles 32 located on the side of the second diffusion particles 33 away from the concave-convex structure 301.

In addition, the particle size of the first diffusion particle 32 is larger than that of the second diffusion particle 33, making it easier for the second diffusion particle 33 to aggregate on the surface of the substrate layer 31 to form a large cluster structure, forming the concave-convex structure 301. Moreover, due to the small particle size of the second diffusion particle 33, the aggregation of a plurality of second diffusion particles 33 can form more forms of the concave-convex structure 301, thereby enabling the second diffusion particle 33 to cooperate with the first diffusion particle 32 to better form an irregular concave-convex structure 301. At the same time, the combination of the first diffusion particle 32 and the second diffusion particle 33 can make the subjective effect of the dark state image of the display panel turn blue when the polarizer 20 is applied to the display panel, improving the subjective visual experience.

The concave-convex structure 301 is composed of a plurality of concave-convex sub-surfaces 310, which are spliced and combined together to form the concave-convex structure 301. The irregular concave-convex structure 301 is composed of a plurality of irregular concave-convex subsurfaces 310. The irregular state of the concave-convex surface 310 can be measured by the angle between the normal of the concave-convex surface 310 and the plane parallel to the protective layer 21. For example, the angle between the normal of the concave-convex surface 310 and the plane parallel to the protective layer 21 is distributed within the range of 0 degrees to 180 degrees. Specifically, a straight line parallel to the plane of the protective layer 21 can be taken as a reference line, and the reference line is defined as a horizontal line, as shown in FIG. 2. H represents the horizontal line, ON represents the normal of the concave-convex sub surface 310, TL represents the tangent of the concave-convex sub surface 310, the normal ON is perpendicular to the tangent TL, and a is the angle between the normal ON of the concave-convex sub surface 310 and the horizontal line H. The angle a between the normal ON of the concave-convex surface 310 and the horizontal line H has a distribution between 0 degrees and 180 degrees. For example, the angle a can be 0 degree, 10 degrees, 20 degrees, 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, 160 degrees, 170 degrees, or 180 degrees. The angle a can be 33.6 degrees, 62.8 degrees, 121.9 degrees.

Furthermore, the haze of the polarizer 20 ranges between 20% and 70%. For example, the haze of the polarizer 20 can be 20%, 30%, 40%, 50%, 60%, 70%. The haze of the polarizer 20 is mainly determined by the state of the concave-convex structure 301 on the dimming film 30, so the haze of the polarizer 20 can be used as another indicator to measure the irregular state of the concave-convex structure 301 of the dimming film 30. The haze of the polarizer 20 refers to the percentage of emitted light deviating from an angle of 2.5 degrees or more in the total transmitted light intensity of the polarizer 20.

In this embodiment, only the first diffusing particle 32 and the second diffusing particle 33 dispersed within the substrate layer 31 are used as examples to illustrate the dimming film. However, the present disclosure is not limited to this. In the dimming film 30 of the present disclosure, more or fewer types of diffusing particles can be set within the substrate layer 31, such as 1, 3, 4, 5 types of diffusing particles. In one embodiment, the substrate layer 31 is equipped with one type of diffusion particle, such as the first diffusion particle 32. The particle size of the first diffusion particle 32 is larger, making it easier to form the concave-convex structure 301, and it is more convenient to adjust the haze parameters required for the polarizer 20 based on the number of particles. In addition, due to the larger particle size of the first diffusion particle 32, it is easier to form the concave-convex structure 301. Therefore, when the dimming film 30 comprises two types of diffusion particles, the first diffusion particle 32 and the second diffusion particle 33, the number of the first diffusion particle 32 can be greater than the number of the second diffusion particle 33, for example, the ratio of the first diffusion particle 32 to the second diffusion particle 33 is 7:3.

The polarizer 20 mentioned above can be applied to a display panel, which comprises a liquid crystal display panel, etc. The embodiment of the present disclosure takes the display panel as an example to illustrate.

Specifically, referring to FIG. 3, the display panel 100 comprises a backlight module 10 and a liquid crystal box 40 set opposite to the backlight module 10. The polarizer 20 is arranged on the side of the liquid crystal box 40 near the backlight module 10, and the dimming film 30 is located on the side of the protective layer 21 near the backlight module 10. Of course, the display panel 100 also comprises an upper polarizer 50 located on the side of the liquid crystal box 40 away from the backlight module 10.

The backlight module 10 comprises optical films such as a backlight source 11, a backplane 12, and a diffusion film 13. The backlight source 11 is fixed on the backplane 12, and the diffusion film 13 is arranged in the light output direction of the backlight source 11. Among them, the back plate 12 can be made of metal material, such as iron or other metals, and of course, the back plate 12 can also be made of alloy material. In other examples of this embodiment, the backplate 12 can also be made of plastic material. Of course, the outer frame formed by the combination of plastic and metal is also feasible, for example, the widely used adhesive iron integrated frame.

The backlight source 11 comprises light emitting diodes (LEDs), mini LEDs, and other light emitting sources. The diffusion film 13 is used to evenly emit the light emitted by the backlight 11 towards various angles, in order to increase the display uniformity of the display panel 100. The backlight module 10 can also include a reflector set between the backlight source 11 and the backplane 12, which is mainly used to increase the light utilization rate of the backlight source 11, thereby increasing the brightness and energy efficiency of the display panel 100.

The liquid crystal box 40 comprises an array substrate 41 and an opposite substrate 42, as well as a liquid crystal layer 43 arranged between the array substrate 41 and the opposite substrate 42.

The polarizer 20 is arranged on the side of the liquid crystal box 40 near the backlight module 10, and the dimming film 30 is arranged on the side of the protective layer 21 near the backlight source 11, and the concave and convex structure 301 on the dimming film 30 is located on the side of the dimming film 30 near the backlight source 11. The polarizing film 20 also comprises a compensation layer 23 and an adhesive layer 24 stacked on the side away from the protective layer 21 of the polarizing film 22. The material of the protective layer 21 comprises polyethylene terephthalate (PET). The protective layer 21 is used to protect the polarizing film 22 from erosion by water and oxygen. The material of the polarizing film 22 comprises polyvinyl alcohol (PVA), and the material of the adhesive layer 24 is preferably pressure sensitive adhesive (PSA). The polarizer 20 is adhered to one side of the array substrate 41 of the liquid crystal box 40 through the adhesive layer 24.

The structure of the upper polarizer 50 is the same as that of the polarizer 20, but the upper polarizer 50 does not include the dimming film 30. The upper polarizer 50 can be adhered to one side of the opposite substrate 42 of the liquid crystal box 40 through an adhesive layer on the upper polarizer 50.

In one embodiment, please refer to FIGS. 1 to 4, which are schematic diagrams of another cross-sectional structure of the display panel according to one embodiment of the present disclosure. Unlike the above embodiments, in the display panel 101 of this embodiment, the dimming film 30 has a concave-convex structure 301 on one side near the protective layer 21. The dimming film 30 comprises a substrate layer 31 and a first diffusion particle 32 dispersed within the substrate layer 31, at least some of which protrude from the surface of the dimming film 30 near the protective layer 21, forming the concave-convex structure 301.

Optionally, the dimming film 30 may also include a substrate 34, wherein the substrate layer 31 is located on the side of the substrate 34 near the protective layer 21, and the substrate 34 may be a glass substrate or the like. Of course, the dimming film 30 in the present disclosure may also exclude the substrate 34. For example, after preparing the dimming film 30 on the substrate 34, the dimming film 30 can be adhered to the protective layer 21 and the substrate 34 can be removed. For other explanations, please refer to the above embodiments and will not be repeated here.

Figure 4:
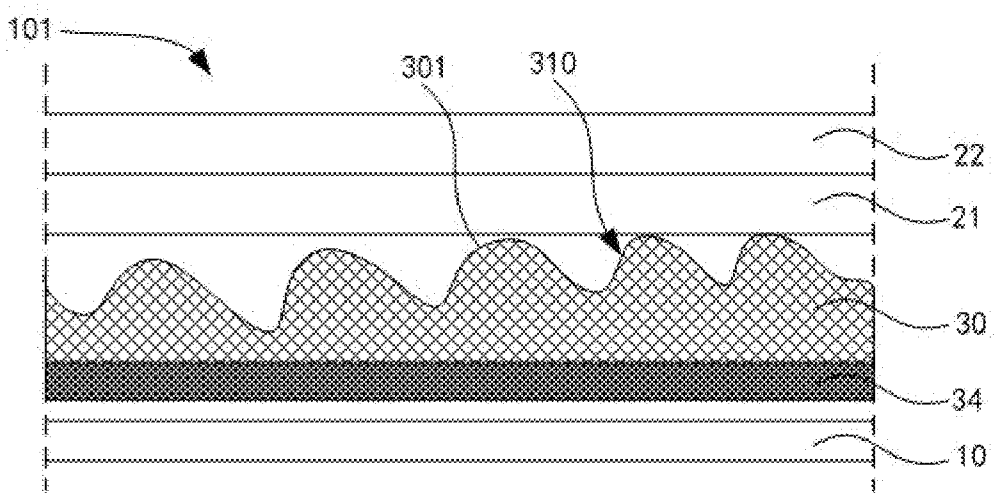
FIG. 4 is another cross-sectional structural diagram of the display panel according to one embodiment of the present disclosure.
Figure 5:
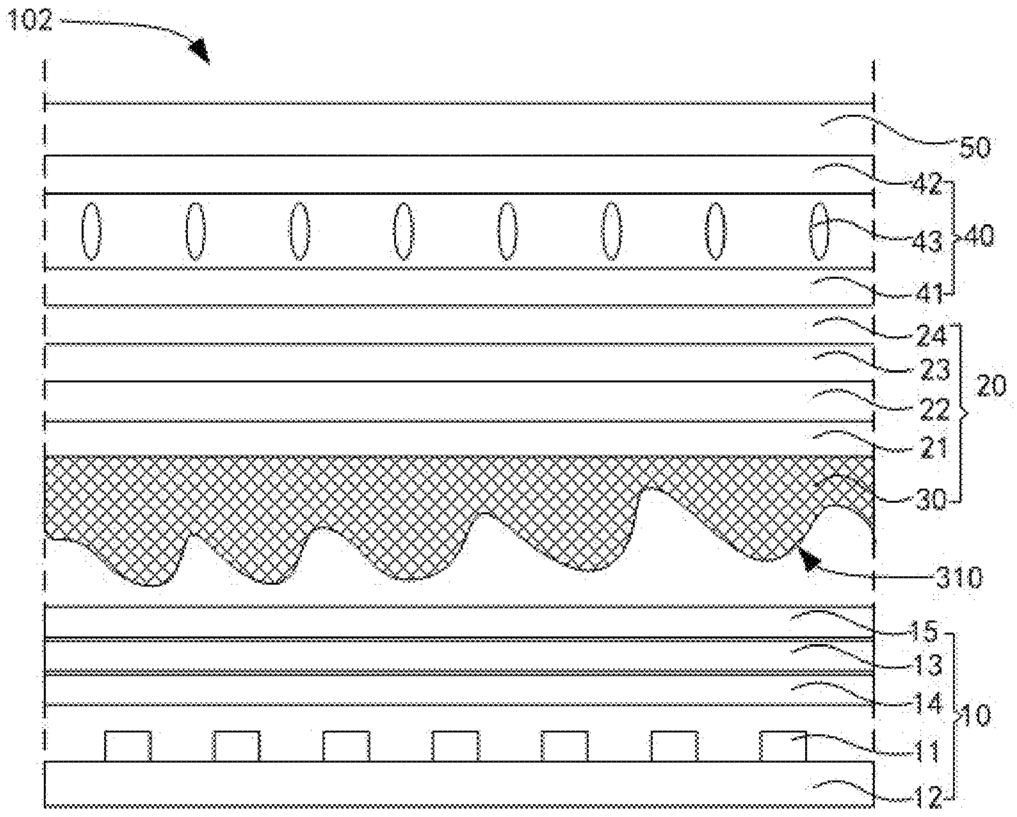
FIG. 5 is another cross-sectional structural diagram of the display panel according to one embodiment of the present disclosure.
Figure 6:
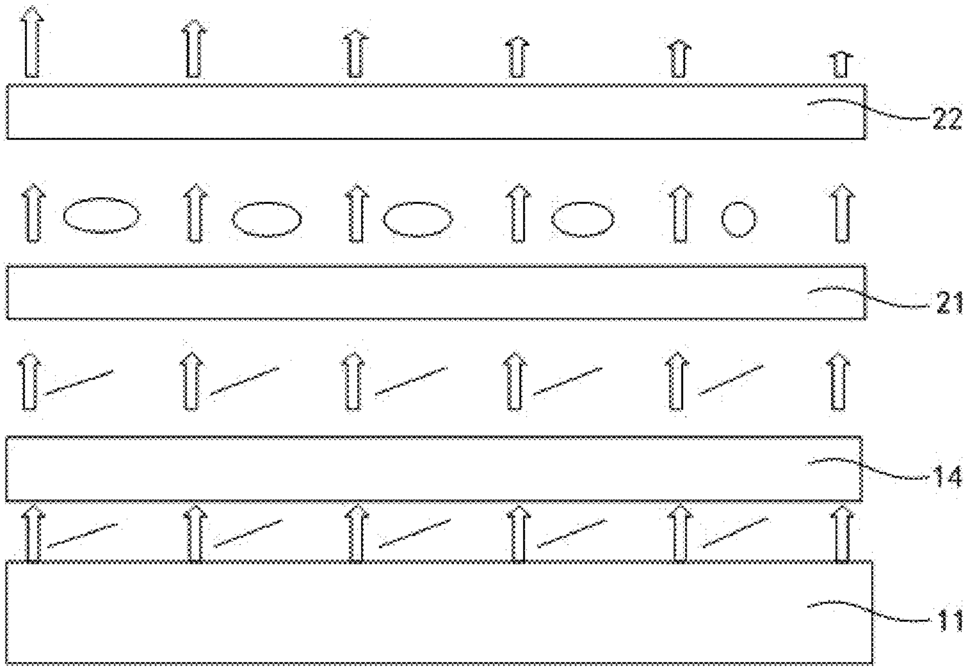
FIG. 6 is another cross-sectional structural diagram of the display panel according to one embodiment of the present disclosure.
Figure 7:
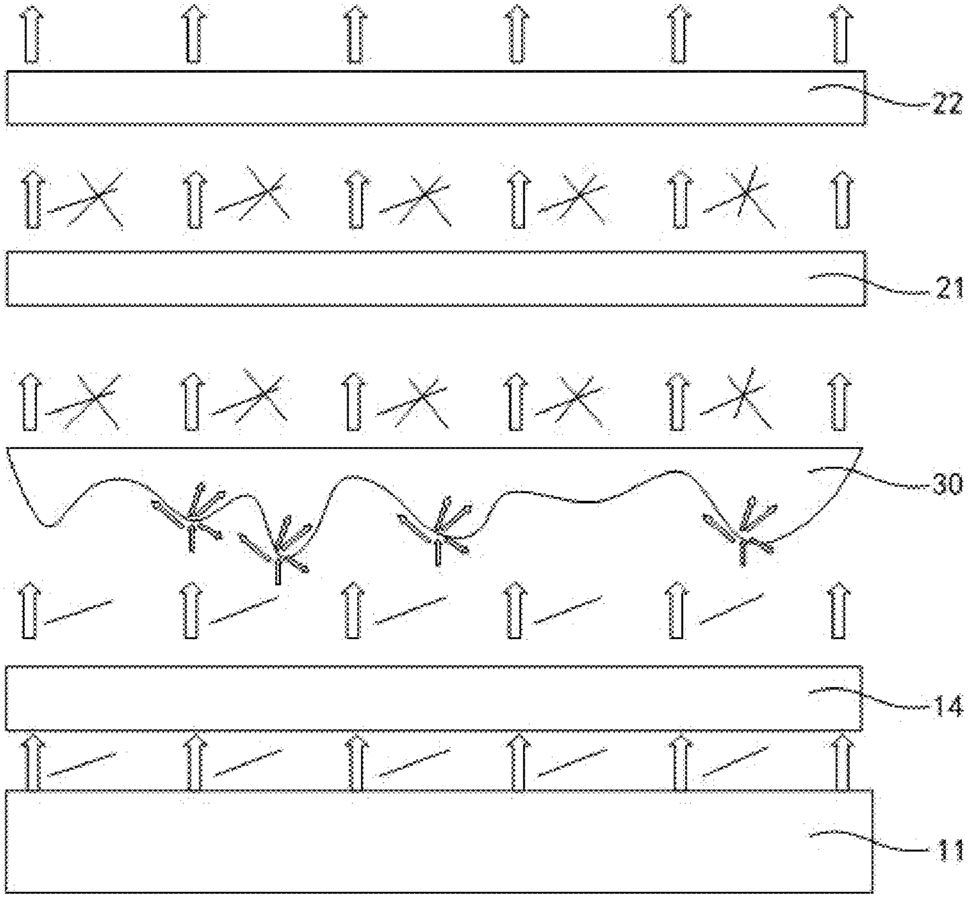
FIG. 7 is a schematic diagram of the propagation of the optical lines in the display panel according to one embodiment of the present disclosure, including a dimming film.

In one embodiment, please refer to FIGS. 1 to 7. FIG. 5 is another cross-sectional structural diagram of the display panel according to one embodiment of the present disclosure. FIG. 6 is another cross-sectional structural diagram of the display panel according to one embodiment of the present disclosure. FIG. 7 is a schematic diagram of the propagation of the optical lines in the display panel according to one embodiment of the present disclosure, including a dimming film. Unlike the above embodiments, in the display panel 102 of this embodiment, the backlight module 10 also comprises a quantum dot film 14 and a brightening film 15, as shown in FIG. 5.

The quantum dot film 14 is arranged in the output direction of the backlight source 11, the diffusion film 13 is arranged on the side of the quantum dot film 14 away from the backplane 12, and the brightening film 15 is arranged on the side of the diffusion film 13 away from the backplane 12. Of course, the present disclosure is not limited to this. The quantum dot film 14 of the present disclosure can also be set between the diffusion film 13 and the brightening film 15, or on the side of the brightening film 15 away from the diffusion film 13.

By setting the quantum dot film 14 and cooperating with the Mini LED backlight source 11, QD Mini LED backlight technology can be used. QD Mini LED backlight technology can use local dimming to achieve regional light control, achieving ultra-high contrast and improving the color gamut of display panel 102.

Refer to FIG. 6. Due to the QD-Mini LED backlight technology being equipped with the added brightening film 15 in the backlight module 10, the light emitted from the backlight source 11 is linearly polarized. When the linearly polarized light passes through the protective layer 21 of the polarizing film 20, due to the birefringence characteristics of the PET of the protective layer 21, the polarization state of the linearly polarized light will change after passing through the PET, becoming elliptical polarized light or circularly polarized light, and different wavelength light will pass through the PET, Emitting light with different polarization states. When light of different wavelengths passes through the polarizing film 22 again, the intensity and energy of the light emitted by different wavelengths are different, resulting in a significant difference in light intensity and energy, leading to a significant difference in light transmittance and exacerbating the rainbow pattern phenomenon. Especially, QD-Mini LED backlight has stronger light intensity in the 620 to 700 nanometer wavelength range than traditional D65 light sources. Combined with the birefringence characteristics of PET itself, the red light band has more transmission light intensity, resulting in the phenomenon of red rainbow stripes in human visual perception.

The polarizer 20 of the present disclosure can effectively solve the rainbow pattern phenomenon in QD Mini LED backlight technology by setting a dimming film 30 with a concave-convex structure 301 on the side near the backlight source 11 of the protective layer 21.

Referring to FIG. 7, when the light emitted from the backlight source 11 passes through the quantum dot film 14 and then passes through the irregular concave and convex structure 301 of the dimming film 30, based on the principle of diffuse reflection, the light will be diffused. The concave and convex structure 301 can convert linearly polarized light into partially polarized light, so that the light emitted from the dimming film 30 is no longer linearly polarized light, and the light will also be evenly dispersed, effectively diffusing light intensity energy, Make the intensity and energy distribution of the light emitted from the dimming film 30 more uniform. When a portion of polarized light emitted from the dimming film 30 passes through the protective layer 21, there will be no change in polarization state. When light of different wavelengths passes through the polarizing film 22 again, the intensity and energy of the light emitted from different wavelengths are the same, resulting in uniform dispersion of the intensity and energy of each wavelength, thereby overcoming the occurrence of rainbow pattern phenomenon.

FIGS. 6 and 7 only illustrate the direction of light propagation and the state of light after passing through different film layers. In order to clearly show the direction of light propagation and the state of light after passing through different film layers, they simply show the approximate position relationship of each film layer, which does not represent the actual film structure. In addition, the lines with arrows in FIGS. 6 and 7 represent the direction of light propagation, while oblique lines, circles, and ellipses represent the state of light. For other explanations, please refer to the above embodiments and will not be repeated here.

Figure 8:
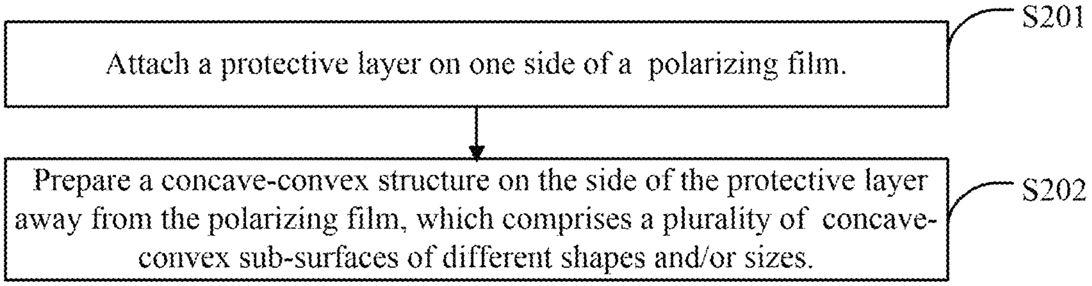
FIG. 8 is a flowchart of a polarizer preparation method according to one embodiment of the present disclosure.

Based on the same inventive concept, the present embodiment also provides a polarizer preparation method, which can be used to prepare a polarizer in one of the above embodiments. The polarizer prepared by the polarizer preparation method can be applied to a display panel in one of the above embodiments. Specifically, please refer to FIGS. 1 to 8, which are flow diagrams of the polarizer preparation method in the present application embodiment. Referring to FIG. 8, the preparation method of the polarizer comprises the following steps S201 and S202.

S201: attaching a protective layer 21 on one side of the polarizing film 22.

Specifically, referring to FIGS. 1 and 3, the protective layer 21 is attached to one side of the polarizing film 22, and a compensation layer 23 and an adhesive layer 24 are attached to the side of the polarizing film 22 away from the protective layer 21. The material of the protective layer 21 comprises polyethylene terephthalate. The protective layer 21 is used to protect the polarizing film 22 from erosion by water and oxygen. The material of the polarizing film 22 comprises polyvinyl alcohol (PVA), and the material of the adhesive layer 24 is preferably pressure sensitive adhesive (PSA).

S202: preparing a concave-convex structure 301 on the side of the protective layer 21 away from the polarizing film 22, which comprises a plurality of concave-convex subsurfaces 310 of different shapes and/or sizes.

Specifically, the step of preparing a concave-convex structure 301 on the side of the protective layer 21 away from the polarizing film 22 include: mixing UV cured resin, UV cured monomer, first diffusion particle 32, and second diffusion particle 33 in a solvent to form a dimming solution.

More specifically, ultraviolet cured resin, ultraviolet cured monomer, first diffusion particle 32, second diffusion particle 33, photo initiator, and other additives are mixed in a solvent to form the dimming solution.

The UV cured resin comprises epoxy acrylate oligomers or polyurethane acrylic oligomers with molecular weights ranging from hundreds to tens of thousands. The UV curing monomer comprises at least one of trimethylolpropane triacrylate (TMPTA), pentaerythritol triacrylate (PETA), and dipentaerythritol hexaacrylate (DPHA).

The photo initiator comprises at least one of benzophenone photo initiators, thioxanthone photo initiators, etc., with a proportion of 1% to 4%. Other additives include thickeners, leveling agents, anti-static agents, etc. The proportion of other additives is 0.1% to 1%. The thickener is used to adjust the viscosity of the product, the leveling agent is used to improve the appearance of the product, and the antistatic agent is used to reduce the surface resistance of the coating. The solvents include ketone solvents, alcohol solvents, lipid solvents, ether solvents, etc.

The first diffusion particle 32 comprises polymethyl methacrylate particles with particle sizes ranging from 2 microns to 3 microns, and the second diffusion particle 33 comprises at least one of inorganic silica particles with particle sizes ranging from 30 nanometers to 70 nanometers, titanium dioxide particles, zinc dioxide particles, and other particles. The mass fraction of the first diffusing particle 32 and the second diffusing particle 33 in the dimming solution ranges from 2.5% to 20%. If the proportion of the first diffusing particle 32 and the second diffusing particle 33 is small, the haze effect of the dimming film 30 formed is poor, which in turn leads to poor haze effect of the formed polarizer 20 and affects the effect of overcoming rainbow stripes. If the proportion of the first diffusion particle 32 and the second diffusion particle 33 is relatively large, when the formed polarizer 20 is applied to the display panel 100, it will cause excessive light diffusion, resulting in a decrease in the contrast and transmittance of the display panel 100. Optionally, the ratio of the first diffusing particle 32 to the second diffusing particle 33 is 7:3.

Coating the dimming solution on the side of the protective layer 21 away from the polarizing film 22.

Specifically, the dimming solution is coated on the side of the protective layer 21 away from the polarizing film 22 using a coating process such as wet coating.

Cure the dimming solution to form a dimming film, and one side of the dimming film forms the concave-convex structure 301. Specifically, the dimming solution coated on one side of the protective layer 21 is cured to form a substrate layer 31 of the UV cured resin. The first diffusing particle 32 and the second diffusing particle 33 are dispersed within the substrate layer 31, and at least some of the first diffusing particle 32 protrudes from the surface of the side of the substrate layer 31 away from the protective layer 21 to form the concave-convex structure 301, The second diffusion particle 33 and the first diffusion particle 32 protrude from the same side surface of the substrate layer 31, and some of the first diffusion particles 32 are located on the side of the second diffusion particle 33 away from the concave-convex structure 301 to form the dimming film 30, as shown in FIG. 2.

In another embodiment, in step S202, the step of preparing a concave-convex structure 301 on the side of the protective layer 21 away from the polarizing film 22 can also be achieved by the following method:

The daylighting etching process etches the side of the protective layer 21 away from the polarizing film 22 to form the concave-convex structure 301. That is, by directly etching on one side of the protective layer 21, the concave-convex structure 301 is directly formed on the protective layer 21. For other explanations, please refer to the above embodiments and will not be repeated here.

In another embodiment, in step S202, the step of preparing a concave-convex structure 301 on the side of the protective layer 21 away from the polarizing film 22 can also be achieved by the following method:

Referring to FIG. 4, the dimming solution is coated and cured on the substrate 34 to form a dimming film 30, which forms the concave-convex structure 301 on the side away from the substrate 34. Specifically, the dimming solution coated on one side of the substrate 34 is cured to form a substrate layer 31 of the UV cured resin. The first diffusing particle 32 and the second diffusing particle 33 are dispersed within the substrate layer 31, and at least some of the first diffusing particle 32 protrudes from the surface of the side of the substrate layer 31 away from the substrate 34 to form the concave-convex structure 301, The second diffusion particle 33 and the first diffusion particle 32 protrude from the same side surface of the substrate layer 31, and some of the first diffusion particles 32 are located on the side of the second diffusion particle 33 away from the concave-convex structure 301 to form the dimming film 30, as shown in FIG. 4.

After forming the dimming film 30, attach the dimming film 30 to the side of the protective layer 21 away from the polarizing film 22. Of course, the dimming film 30 in the present disclosure may also exclude the substrate 34. For example, after preparing the dimming film 30 on the substrate 34, the dimming film 30 can be adhered to the protective layer 21 and the substrate 34 can be removed.

According to the above embodiments, it can be seen that:

The present disclosure provides a polarizer and its preparation method, as well as a display panel. The polarizing film comprises a polarizing film, a protective layer, and a dimming film. The protective layer is set on one side of the polarizing film, and the dimming film is set on the side of the protective layer away from the polarizing film. The dimming film has a concave-convex structure, which comprises a plurality of concave-convex surfaces of different shapes and/or sizes. The present disclosure involves setting a dimming film with a concave-convex structure on the side of the protective layer away from the polarizing film, so that when the light directed towards the polarizing film passes through the concave-convex structure of the dimming film, based on the principle of diffuse reflection, the light will be evenly scattered. When the evenly scattered light passes through the protective layer again, the intensity and energy of each wavelength will be evenly dispersed, thereby avoiding the occurrence of rainbow pattern phenomenon in existing display devices.

In the above embodiments, the descriptions of each embodiment have their own emphasis. For parts that are not described in detail in a certain embodiment, please refer to the relevant descriptions of other embodiment.

It should be understood that the foregoing description is for purposes of illustration and not limitation. Many embodiments and many applications other than the examples provided will be apparent to those of skill in the art from reading the foregoing description. The scope of the present teachings, therefore, should be determined not with reference to the above description, but should be determined with reference to the preceding claims, along with the full scope of equivalents to which such claims are entitled. The disclosures of all articles and references, including patent applications and publications, are hereby incorporated by reference for completeness. The omission from the preceding claims of any aspect of the subject matter disclosed herein is not intended to be a disclaimer of such subject matter, nor should it be considered that the applicant did not consider the subject matter to be part of the disclosed subject matter of the application.

What is claimed is:

1. A polarizer, comprising:

a polarizing film; and a protective layer, arranged on the polarizing film; and a dimming film arranged on a side of the protective layer away from the polarizing film;

wherein the side of the protective layer away from the polarizing film is provided with a concave-convex structure which comprises a plurality of concave-convex sub-surfaces of different shapes or sizes; and the dimming film comprises:

a substrate layer;

a plurality of first diffusion particles dispersed within the substrate layer; and a plurality of second diffusion particles dispersed within the substrate layer;

wherein the concave-convex structure is formed by some of the plurality of first diffusion particles protruding from a surface of the dimming film on one side away from or adjacent to the protective layer; and the plurality of second diffusion particles and the plurality of first diffusion particles protrude from the same side of the surface of the dimming film, and some of the plurality of first diffusion particles are located on a side of the plurality of second diffusion particles away from the concave-convex structure, wherein a density of the plurality of first diffusion particles is greater than a density of the plurality of second diffusion particles.

2. The polarizer as claimed in claim 1, wherein a size of each of the first diffusion particles is greater than a size of each of the second diffusion particles.

3. The polarizer as claimed in claim 2, wherein the substrate layer comprises an ultraviolet (UV) cured resin substrate, each of the first diffusion particles comprises polymethyl methacrylate particles, and each of the second diffusion particles comprises one of silicon dioxide particles, titanium dioxide particles, and zinc dioxide particles.

4. The polarizer as claimed in claim 1, wherein a haze range of the polarizer is 20% to 70%.

5. The polarizer as claimed in claim 1, wherein an angle between a normal of each of the concave-convex surfaces and a plane parallel to the protective layer ranges between 0 to 180 degrees.

6. A method for preparing a polarizer, comprising:

attaching a protective layer on one side of a polarizing film; and preparing a concave-convex structure, which comprises a plurality of concave-convex sub-surfaces of different shapes or sizes, on one side of the protective layer away from the polarizing film;

wherein the preparation of the concave-convex structure comprises:

mixing a UV curable resin, a UV curable monomer, and a plurality of first diffusion particles in a solvent to form a dimming solution;

coating the dimming solution on the side of the protective layer away from the polarizing film; and curing the dimming solution to form a dimming film, and one side of the dimming film forms the concave-convex structure;

wherein the dimming solution further comprises a plurality of second diffusion particles, and the plurality of second diffusion particles and the plurality of first diffusion particles protrude from the same side of the surface of the dimming film, and some of the plurality of first diffusion particles are located on a side of the plurality of second diffusion particles away from the concave-convex structure, wherein a density of the plurality of first diffusion particles is greater than a density of the plurality of second diffusion particles.

7. The method as claimed in claim 6, wherein a particle size of each of the second diffusion particles is smaller than that of each of the first diffusion particles, each of the second diffusion particles comprises a plurality of inorganic silica particles with a plurality of particle sizes ranging from 30 nanometers to 70 nanometers, and each of the first diffusion particles comprises a plurality of polymethyl methacrylate particles with a plurality of particle sizes ranging from 2 microns to 3 microns.

8. The method as claimed in claim 7, wherein a mass fraction of the first diffusion particles and the second diffusion particles in the dimming solution ranges from 2.5% to 20%, and a ratio of the first diffusion particles and the second diffusion particles is 7:3.

9. A display panel, comprising a polarizer, the polarizer comprising:

a polarizing film; and a protective layer, arranged on the polarizing film and comprising a concave-convex structure with a plurality of irregular concave-convex sub-surfaces; and a dimming film arranged on a side of the protective layer away from the polarizing film;

wherein the dimming film comprises:

a substrate layer;

a plurality of first diffusion particles dispersed within the substrate layer; and a plurality of second diffusion particles dispersed within the substrate layer;

wherein the concave-convex structure is formed by some of the plurality of first diffusion particles protruding from a surface of the dimming film on one side away from or adjacent to the protective layer; and the plurality of second diffusion particles and the plurality of first diffusion particles protrude from the same side of the surface of the dimming film, and some of the plurality of first diffusion particles are located on a side of the plurality of second diffusion particles away from the concave-convex structure, wherein a density of the plurality of first diffusion particles is greater than a density of the plurality of second diffusion particles.

10. The display panel as claimed in claim 9, wherein a haze range of the polarizer is 20% to 70%.

11. The display panel as claimed in claim 9, wherein an angle between a normal of each of the concave-convex surfaces and a plane parallel to the protective layer ranges between 0 to 180 degrees.

* * * * *